(12) United States Patent
Kuroda

(10) Patent No.: US 11,754,114 B2
(45) Date of Patent: Sep. 12, 2023

(54) BALL JOINT, STABILIZER LINK, AND BALL JOINT MANUFACTURING METHOD

(71) Applicant: NHK SPRING CO., LTD., Kanagawa (JP)

(72) Inventor: Shigeru Kuroda, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 469 days.

(21) Appl. No.: 17/050,100

(22) PCT Filed: Apr. 12, 2019

(86) PCT No.: PCT/JP2019/016013
§ 371 (c)(1),
(2) Date: Oct. 23, 2020

(87) PCT Pub. No.: WO2019/208272
PCT Pub. Date: Oct. 31, 2019

(65) Prior Publication Data
US 2021/0231166 A1    Jul. 29, 2021

(30) Foreign Application Priority Data

Apr. 27, 2018  (JP) ................ 2018-086373

(51) Int. Cl.
*F16C 11/06* (2006.01)
*B60G 7/00* (2006.01)
*B60G 21/055* (2006.01)

(52) U.S. Cl.
CPC .......... *F16C 11/0685* (2013.01); *B60G 7/005* (2013.01); *B60G 21/0551* (2013.01);
(Continued)

(58) Field of Classification Search
CPC ... F16C 11/06; F16C 11/0619; F16C 11/0628; F16C 11/0633; F16C 11/0638
See application file for complete search history.

(56) References Cited

U.S. PATENT DOCUMENTS 3,554,586 A * 1/1971 Cutler ................. F16C 11/0638
403/140
3,787,127 A * 1/1974 Cutler ................. F16C 11/0638
403/140

(Continued)

FOREIGN PATENT DOCUMENTS

JP     60-85880 U    6/1985
JP     61-127785 U   8/1986
(Continued)

OTHER PUBLICATIONS

International Search Report, Application No. PCT/JP2019/016013, dated Jul. 2, 2019.
(Continued)

*Primary Examiner* — Daniel J Wiley
(74) *Attorney, Agent, or Firm* — GREENBLUM & BERNSTEIN, P.L.C.

(57) ABSTRACT

An axial ball joint includes a ball stud including a stud portion and a ball portion; a metal housing configured to rotatably support the ball portion of the ball stud; a resin ball sheet provided in an interposed manner between the ball portion and the housing. The housing is formed in a bottomed cylindrical shape by press work. The housing has a bottom wall and a peripheral side wall which are set respectively to thicknesses substantially equal to each other. The bottom wall and the peripheral side wall of the housing have therebetween a boundary portion formed with multiple rib portions which project in a brace shape from outside to inside of the housing.

11 Claims, 10 Drawing Sheets

(52) U.S. Cl.
CPC .. *B60G 2204/416* (2013.01); *B60G 2204/422* (2013.01); *B60G 2206/427* (2013.01); *F16C 2326/05* (2013.01)

(56) References Cited

U.S. PATENT DOCUMENTS

| | | | | |
|---|---|---|---|---|
| 3,967,907 | A | * | 7/1976 | Schmidt .............. F16C 11/0638 403/140 |
| 4,297,047 | A | * | 10/1981 | Farrant .............. F16C 11/0638 403/138 |
| 4,372,621 | A | * | 2/1983 | Farrant ................. F16C 11/086 384/2 |
| 4,564,307 | A | * | 1/1986 | Ito ....................... F16C 11/0638 403/140 |
| 4,750,885 | A | * | 6/1988 | Ito ....................... F16C 11/0638 403/135 |
| 5,368,408 | A | * | 11/1994 | Shimizu .............. F16C 11/0638 403/136 |
| 6,042,293 | A | * | 3/2000 | Maughan .............. F16C 11/068 403/135 |
| 8,678,656 | B2 | * | 3/2014 | Richter ................. F16C 11/068 403/135 |
| 2005/0111908 | A1 | * | 5/2005 | Green .................... B62D 7/166 403/135 |
| 2006/0269356 | A1 | * | 11/2006 | Jordan ................ F16C 11/0633 403/122 |
| 2015/0001824 | A1 | | 1/2015 | Kuroda |
| 2016/0003290 | A1 | * | 1/2016 | Trotter ..................... F16C 7/06 403/56 |

FOREIGN PATENT DOCUMENTS

| | | |
|---|---|---|
| JP | 2001-140851 A | 5/2001 |
| JP | 2010-101416 A | 5/2010 |
| JP | 2013-167314 A | 8/2013 |

OTHER PUBLICATIONS

International Preliminary Report on Patentability, Application No. PCT/JP2019/016013, dated Oct. 27, 2020.

* cited by examiner

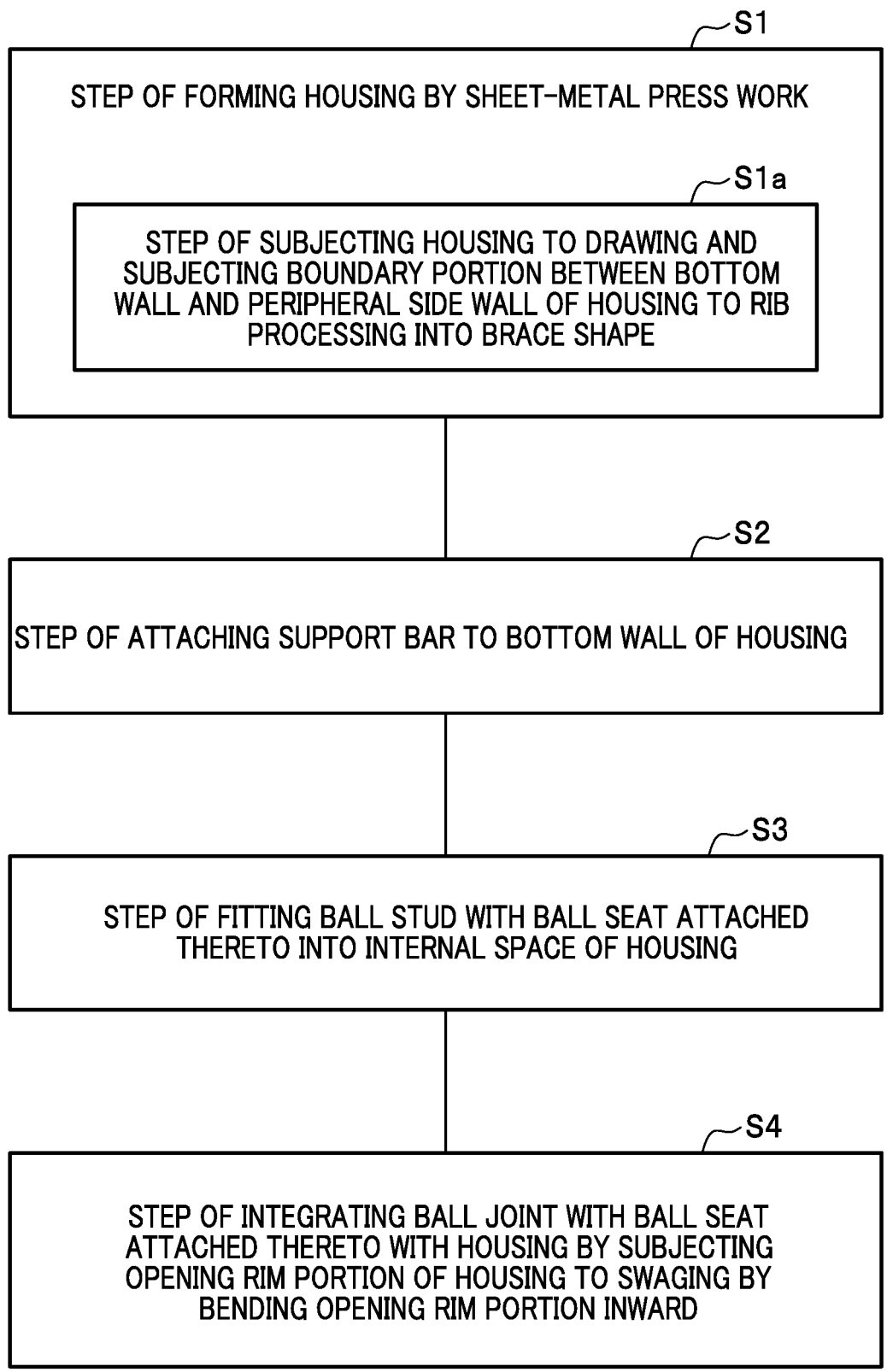

BALL JOINT, STABILIZER LINK, AND BALL JOINT MANUFACTURING METHOD

TECHNICAL FIELD

The present invention relates to a ball joint, a stabilizer link, and a ball joint manufacturing method.

BACKGROUND ART

Patent Literature 1 discloses an invention of a ball joint configured to house a ball portion of a ball stud in a metal housing having a bottomed cylindrical shape. The ball stud is swingably supported by the housing while using the ball portion as a pivot. A resin ball seat is provided in an interposed manner between the housing and the ball portion. When the ball stud swings relative to the housing, the ball portion slides relative to the ball seat.

The ball joint according to Patent Literature 1 (see FIG. 2 of Literature 1) includes an outer ball joint and an inner ball joint. The outer ball joint is joined to the inner ball joint via a bar-shaped tie rod (a support bar).

On the outer ball joint side, an axis of the ball stud extends in a radial direction relative to an axis of the support bar that extends linearly. In contrast, on the inner ball joint side, the axis of the ball stud extends coaxially with the support bar. In the following description, the former will be referred to as a radial ball joint and the latter will be referred to as an axial ball joint.

As mentioned above, in the axial ball joint according to Patent Literature 1, the ball portion of the ball joint is slidably housed inside the metal housing by the intermediary of the resin ball seat. On a bottom wall of the metal housing, a rod-shaped connecting bar (a connecting portion; see FIG. 2 of Literature 1) connected to an end portion of a rack shaft is provided coaxially along the axis of the support bar and the ball stud.

CITATION LIST

Patent Literature

Patent Literature 1: Japanese Patent Application Publication No. 2010-101416

SUMMARY OF INVENTION

Technical Problem

Of the ball joints according to Patent Literature 1, the link bar is provided to the bottom wall of the metal housing in the case of the axial ball joint. Accordingly, the bottom wall of the housing is set thicker than a peripheral side wall thereof so that the bottom wall can withstand an input of an axial load from the connecting bar. It is therefore necessary to select a forging process and the like in a manufacturing process of the housing so as to materialize a design with the thickness of the bottom wall being different from the thickness of the peripheral side wall. As a consequence, the degree of freedom of selection in the manufacturing process of the housing is reduced. Moreover, the weight is large, which is also a room for improvement.

The present invention has been made in view of the above-mentioned circumstances. An object of the present invention is to provide a ball joint and a stabilizer link, which are capable of expanding the degree of freedom of selection in a manufacturing process of a housing, contributing to weight saving, and achieving simplification of a manufacturing process.

Another object of the present invention is to provide a ball joint manufacturing method which is capable of expanding the degree of freedom of selection in the manufacturing process of the housing, contributing to weight saving, and achieving simplification of the manufacturing process.

Solution to Problem

To solve the aforementioned problems, the most principal features of a ball joint according to a first aspect of the present invention are defined as a ball joint which includes a ball stud including a stud portion and a ball portion, a metal housing configured to rotatably support the ball portion of the ball stud, and a resin ball seat provided in an interposed manner between the ball portion and the housing. The housing is formed in a bottomed cylindrical shape by press work. The housing has a bottom wall and a peripheral side wall which are set respectively to thicknesses substantially equal to each other. The bottom wall and the peripheral side wall of the housing have therebetween a boundary portion formed with multiple rib portions which project in a brace shape from outside to inside of the housing.

Meanwhile, the most principal features of a ball joint manufacturing method according to an eleventh aspect of the present invention are defined as a method of manufacturing a ball joint including a ball stud provided with a stud portion and a ball portion, a metal housing configured to rotatably support the ball portion of the ball stud, and a resin ball seat provided in an interposed manner between the ball portion and the housing. The method includes the steps of forming the housing by press work, subjecting the housing to drawing and subjecting a boundary portion between a bottom wall and a peripheral side wall of the housing to rib processing into a brace shape, attaching a support bar to the bottom wall of the housing, fitting the ball stud with the ball seat attached thereto into an internal space of the housing, and integrating the ball stud with the ball seat attached thereto with the housing by subjecting an opening rim portion of the housing to swaging by bending the opening rim portion inward.

Advantageous Effects of Invention

According to the ball joint of the first aspect of the present invention, it is possible to provide a ball joint which is capable of expanding the degree of freedom of selection in a manufacturing process of a housing, contributing to weight saving, and achieving simplification of the manufacturing process.

Meanwhile, according to the ball joint manufacturing method of the eleventh aspect of the present invention, it is possible to provide a ball joint manufacturing method which is capable of expanding the degree of freedom of selection in the manufacturing process of the housing, contributing to weight saving, and achieving simplification of the manufacturing process.

BRIEF DESCRIPTION OF DRAWINGS

FIG. 6 is an operation flowchart showing a ball joint manufacturing method according to the embodiment of the present invention.

DESCRIPTION OF EMBODIMENTS

Figure 1:
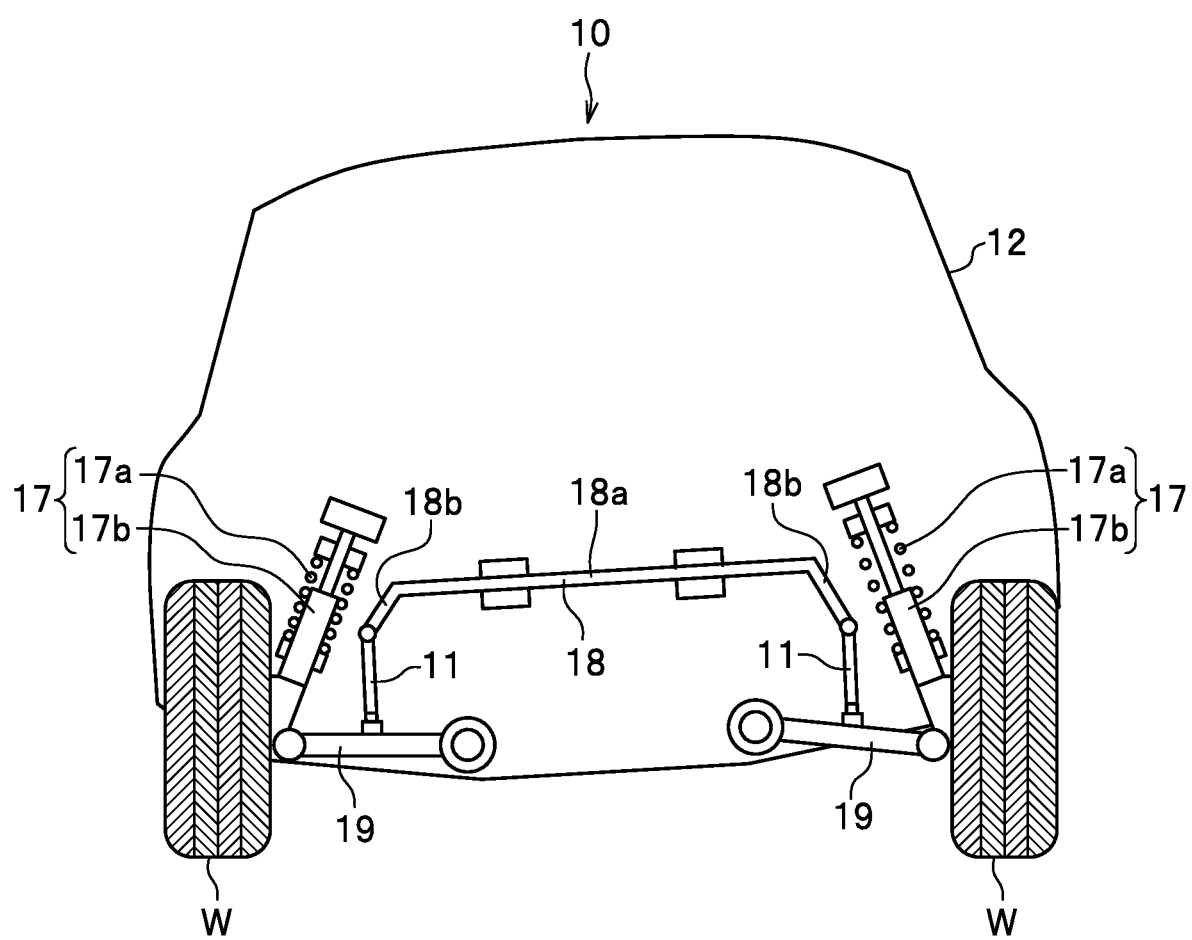
FIG. 1 is a perspective view showing a state where stabilizer links according to an embodiment of the present invention are attached to a vehicle.

A ball joint, a stabilizer link, and a ball joint manufacturing method according to an embodiment of the present invention will be described below in detail with reference to the drawings as appropriate.

Note that members having common functions or members having functions corresponding to one another in the drawings shown below will be basically denoted by common reference signs. Meanwhile, for the convenience of explanation, sizes and shapes of the members may be schematically illustrated in a deformed manner or an exaggerated manner in some cases.

(Stabilizer Link 11 According to Embodiment of Present Invention and Schematic Constructions of its Surroundings)

Figure 2:
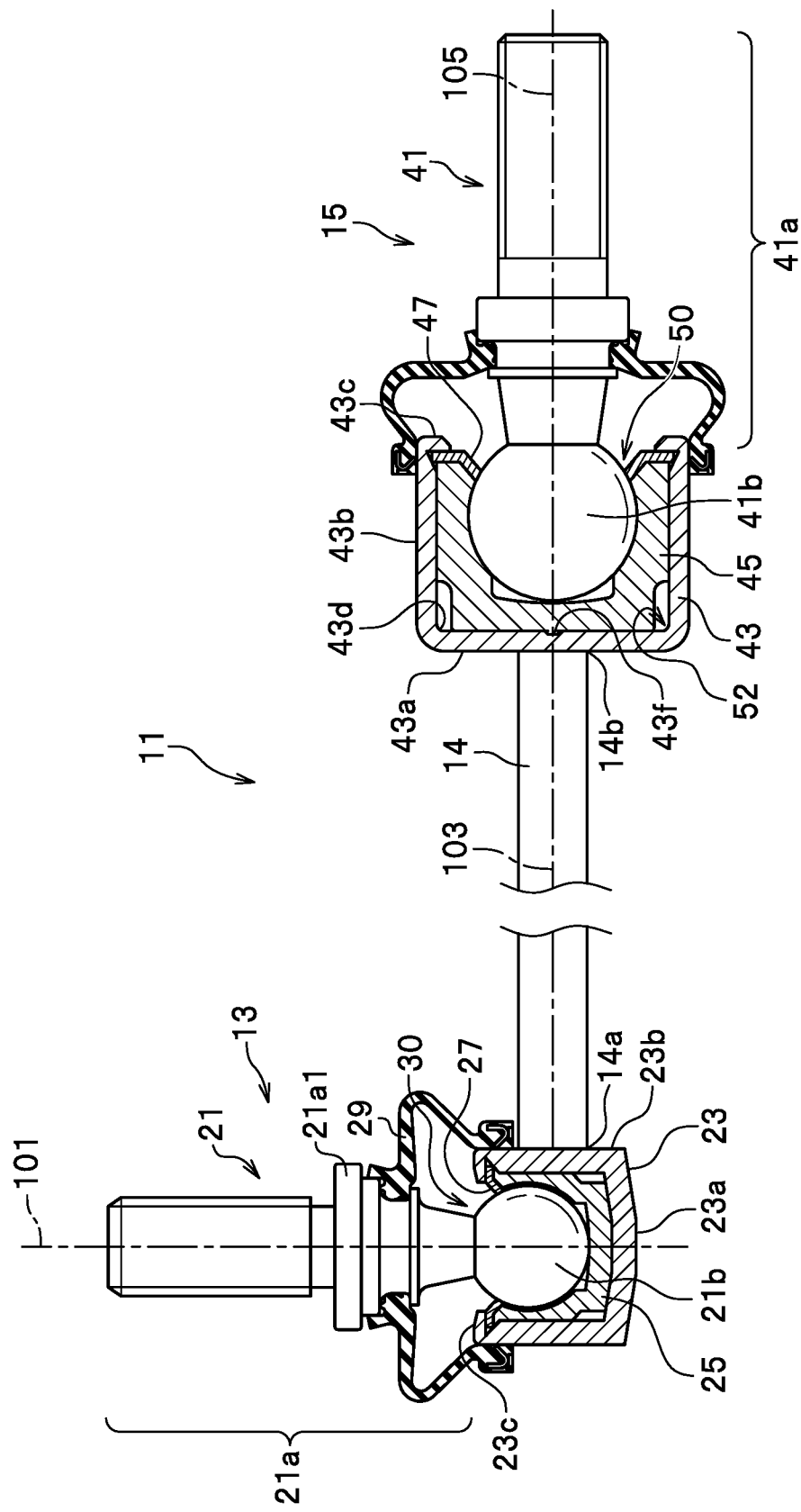
FIG. 2 is a cross-sectional view showing an overall construction of a stabilizer link according to the embodiment of the present invention.

First, a stabilizer link 11 according to an embodiment of the present invention and schematic constructions of its surroundings will be described by using an example in which the stabilizer link 11 is attached to a vehicle 10. FIG. 1 is a perspective view showing a state where the stabilizer links 11 according to the embodiment of the present invention are attached to the vehicle 10. FIG. 2 is a cross-sectional view showing an overall construction of each stabilizer link 11 according to the embodiment of the present invention.

As shown in FIG. 1, wheels W are attached to a vehicle body 12 of the vehicle 10 via axle sides of suspension devices 17. Each suspension device 17 includes a coil spring 17a and a shock absorber 17b in order to absorb and reduce shocks and vibrations transmitted from a road surface to the vehicle body 12 through the wheel W. Although the suspension device 17 is not limited to a particular device, a MacPherson strut-type device may be favorably used, for example.

As shown in FIG. 1, the right and left suspension devices 17 are connected to each other via a stabilizer 18 that is formed from a substantially U-shaped spring steel rod and the like. In order to reduce rolling of the vehicle by way of an increase in roll stiffness (resistance against torsional deformation) of the vehicle body 12, the stabilizer 18 includes a torsion bar portion 18a extending between the right and left wheels W, and a pair of arm portions 18b that extend in a bent manner from two ends of the torsion bar portion 18a.

Each arm portion 18b of the stabilizer 18 is connected via the stabilizer link 11 to a lower arm 19 that elastically supports the axle side of the suspension device 17. The way of connection is the same between the right and left wheel W sides. As shown in FIG. 2, the stabilizer link 11 includes a pair of ball joints 13 and 15 which are provided respectively, at two ends of a substantially straight support bar 14 made of a metal such as steel.

Of the pair of ball joints 13 and 15 shown in FIG. 2, one is the existing radial ball joint 13 and the other is the axial ball joint 15 according to the present invention.

As shown in FIG. 2, the radial ball joint 13 includes a metal ball stud 21, a metal housing 23, and a resin ball seat 25. The ball stud 21 is formed by providing a spherical ball portion 21b to one end of a columnar stud portion 21a. The housing 23 includes a bottom wall 23a and a peripheral side wall 23b. The housing 23 is formed into a bottomed cylindrical shape by cold forging, for example.

The resin ball seat 25 is provided in an interposed manner between the ball portion 21b of the ball stud 21 and the housing 23. The ball stud 21 is located at a neutral position shown in FIG. 2 in a state where no load is applied thereto. The ball stud 21 is swingably and rotatably supported by the housing 23 by using the ball portion 21b as a pivot in the case of receiving the applied load.

A C-shaped stop ring 27 designed to confine a spherical surface of the ball portion 21b is provided to an opening rim portion 23c of the housing 23 in a state where the ball portion 21b of the ball stud 21 is housed in an internal space of the housing 23, so as to keep the ball portion 21b of the ball stud 21 from coming off the internal space of the housing 23.

In the radial ball joint 13 constructed as described above, the ball portion 21b of the ball stud 21 slides relative to the ball seat 25 when the ball stud 21 swings relative to the housing 23. Moreover, the ball portion 21b of the ball stud 21 slides relative to the ball seat 25 also when the ball stud 21 rotates about an axis 101 thereof relative to the housing 23.

As shown in FIG. 2, the stud portion 21a of the ball stud 21 includes a disc-shaped flange portion 21a1. A looped dust cover 29 formed from an elastic body such as rubber is fitted into a gap between the flange portion 21a1 and the opening rim portion 23c of the housing 23 in such a way as to cover this gap. The dust cover 29 plays a role to inhibit foreign substances including rainwater and dust from entering a joint portion 30.

The end 14a of the support bar 14 is joined by welding to the peripheral side wall 23b of the housing 23 in order to establish two-way transmission of the load between the pair of ball joints 13 and 15.

In the radial ball joint 13, the axis 101 of the ball stud 21 at the neutral position extends in a radial direction relative to an axis 103 of the support bar 14 that extends straight along the axial direction as shown in FIG. 2. This is why the radial ball joint 13 is called a radial type.

On the other hand, in the axial ball joint 15 according to the present invention, an axis 105 of a ball stud 41 at a neutral position is provided coaxially with the axis 103 of the support bar 14 which extends straight along the axial direction as shown in FIG. 2. This is why the ball joint 15 is called an axial type.

As shown in FIG. 2, the axial ball joint 15 includes the metal ball stud 41, a metal housing 43, and a resin ball seat 45 as with the above-mentioned radial ball joint 13. The ball stud 41 is formed by providing a spherical ball portion 41b to one end of a columnar stud portion 41a.

Although the metal material for the housing 43 is not limited to a particular material, a material having good malleability such as steel, aluminum, and copper is favorably used. Although the resin material for the ball seat 45 is not limited to a particular material, a thermoplastic resin such as POM is favorably used.

The housing 43 is formed into a bottomed cylindrical shape by sheet-metal press work inclusive of drawing and rib processing. A bottom wall 43a and a peripheral side wall 43b constituting the housing 43 are set to the same thickness t1 (see FIG. 3D). A manufacturing process of the housing 43 will be described later in detail.

A looped inner bottom corner portion 43d located at a boundary portion 52 (see FIG. 3A, for example) between the bottom wall 43a and the peripheral side wall 43b of the housing 43 is provided with rib portions 51 (see FIG. 3A, for example) for increasing a deformation strength concerning the boundary portion 52. A construction of each rib portion 51 will be described later in detail.

The resin ball seat 45 is provided in an interposed manner between the ball portion 41b of the ball stud 41 and the housing 43. A construction of the ball seat 45 will be described later in detail. The ball stud 41 is located at a neutral position shown in FIG. 2 in the state where no load is applied thereto. The ball stud 41 is swingably and rotatably supported by the housing 43 by using the ball portion 41b as a pivot in the case of receiving the applied load.

A C-shaped stop ring 47 designed to confine a spherical surface of the ball portion 41b is provided to an opening rim portion 43c of the housing 43 in a state where the ball portion 41b of the ball stud 41 is housed in an internal space of the housing 43, so as to keep the ball portion 41b of the ball stud 41 from coming off the internal space of the housing 43.

In the axial ball joint 15 constructed as described above, the ball portion 41b of the ball stud 41 slides relative to the ball seat 45 when the ball stud 41 swings relative to the housing 43. Moreover, the ball portion 41b of the ball stud 41 slides relative to the ball seat 45 also when the ball stud 41 rotates about the axis 103 of the support bar 14 relative to the housing 43.

As shown in FIG. 2, the stud portion 41a of the ball stud 41 includes a disc-shaped flange portion 41a1. A looped dust cover 49 formed from an elastic body such as rubber is fitted into a gap between the flange portion 41a1 and the opening rim portion 43c of the housing 43 in such a way as to cover this gap. The dust cover 49 plays a role to inhibit foreign substances including rainwater and dust from entering a joint portion 50.

Another end 14b of the support bar 14 is joined by welding to the bottom wall 43a of the housing 43 in order to establish two-way transmission of the load between the pair of ball joints 13 and 15. Here, in the axial ball joint 15, the axis 105 of the ball stud 41 at the neutral position is located coaxially with the axis 103 of the support bar 14 as shown in FIG. 2. For this reason, an axial load in a detaching direction of the ball stud 21 from the housing 23 is generated depending on the direction of the applied load that acts on the support bar 14 or the ball stud 41.

In order to successfully withstand the axial load in the detaching direction of the ball stud 21 from the housing 23, the axial ball joint 15 is required to have a greater axial-load bearing resistance in the detaching direction as compared to that of the radial ball joint 13.

To meet this demand, the size of the ball stud 41 (including a spherical diameter concerning the ball portion 41b) in the axial ball joint 15 is set larger than the size of the ball stud 21 (including a spherical diameter concerning the ball portion 21b) in the radial ball joint 13. Moreover, the sizes of the housing 43 (inclusive of the thickness t1 of the bottom wall 43a and the peripheral side wall 43b) and of the ball seat 45 in the axial ball joint 15 are also set larger than the sizes of the housing 23 (inclusive of a thickness of the bottom wall 23a and the peripheral side wall 23b) and of the ball seat 25 in the radial ball joint 13.

(Housing 43 Serving as Constituent Member of Ball Joint According to Embodiment of Present Invention)

First, the metal housing 43 serving as a constituent member of the ball joint 15 according to the embodiment of the present invention will be described with reference to FIGS. 3A to 3F.

Figure 3A:
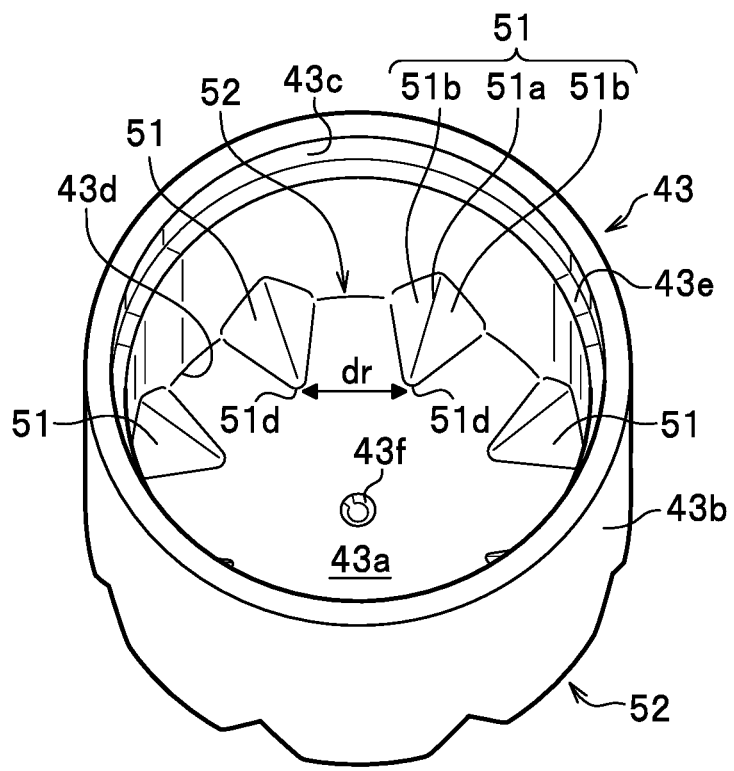
FIG. 3A is a perspective view showing an internal space of a housing serving as a constituent member of a ball joint according to the embodiment of the present invention, which is viewed through an opening thereof.
Figure 3B:
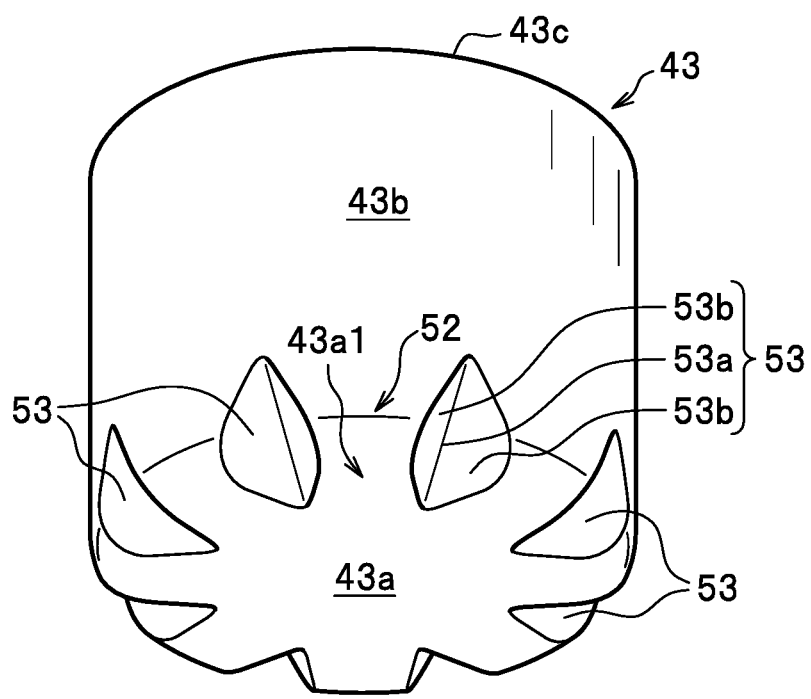
FIG. 3B is a perspective view showing exterior appearance of the housing illustrated in FIG. 3A, which is viewed obliquely from a bottom side thereof.
Figure 3C:
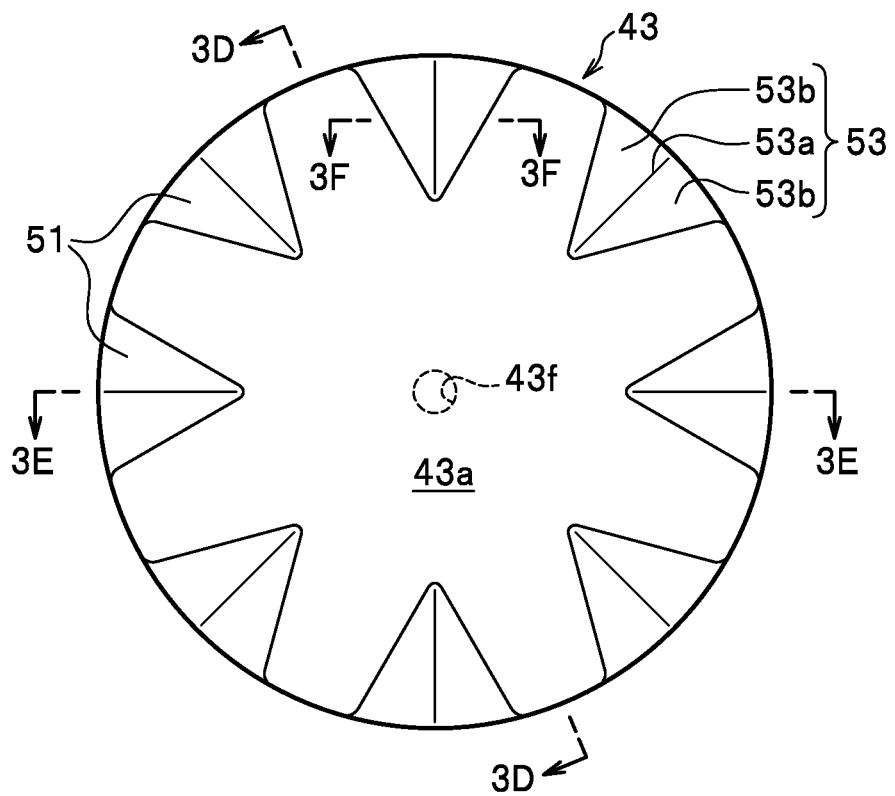
FIG. 3C is a diagram of the housing illustrated in FIG. 3A, which is viewed from the bottom side thereof.
Figure 3D:
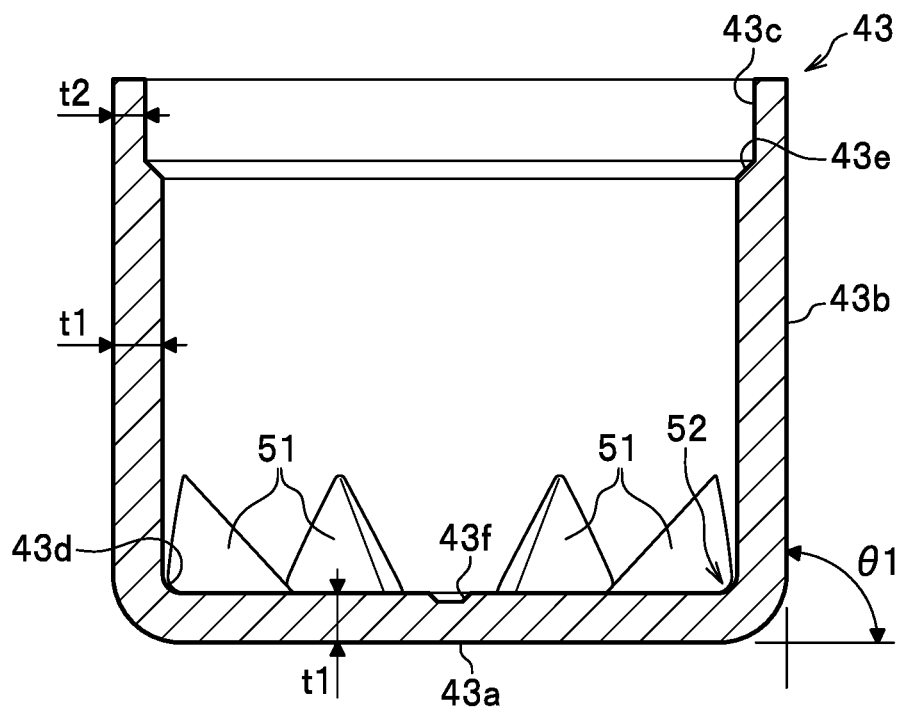
FIG. 3D is a cross-sectional view of the housing illustrated in FIG. 3C, which is taken along the 3D-3D line and viewed in the direction of arrows indicated therein.
Figure 3E:
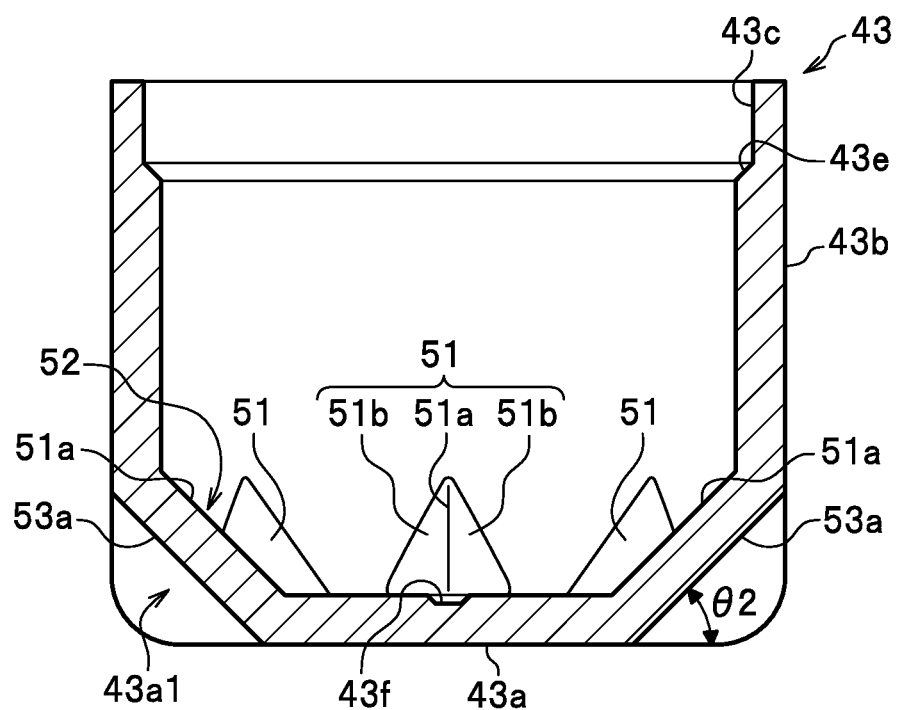
FIG. 3E is a cross-sectional view of the housing illustrated in FIG. 3C, which is taken along the 3E-3E line and viewed in the direction of arrows indicated therein.
Figure 3F:
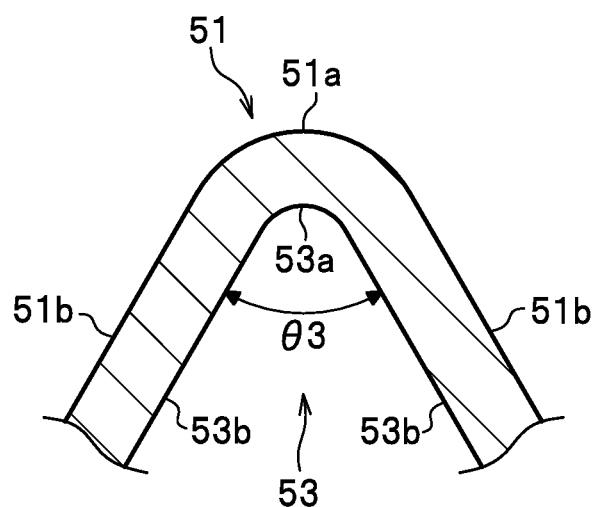
FIG. 3F is a cross-sectional view of a rib portion provided to the housing illustrated in FIG. 3C, which is taken along the 3F-3F line and viewed in the direction of arrows indicated therein.

FIG. 3A is a perspective view showing the internal space of the housing 43 serving as the constituent member of the ball joint 15 according to the embodiment of the present invention, which is viewed through an opening thereof. FIG. 3B is a perspective view showing exterior appearance of the housing 43 illustrated in FIG. 3A, which is viewed obliquely from a bottom side thereof. FIG. 3C is a diagram of the housing 43 illustrated in FIG. 3A, which is viewed from the bottom side thereof. FIG. 3D is a cross-sectional view of the housing 43 illustrated in FIG. 3C, which is taken along the 3D-3D line and viewed in the direction of arrows indicated therein. FIG. 3E is a cross-sectional view of the housing 43 illustrated in FIG. 3C, which is taken along the 3E-3E line and viewed in the direction of arrows indicated therein. FIG. 3F is a cross-sectional view of the rib portion 51 provided to the housing 43 illustrated in FIG. 3C, which is taken along the 3F-3F line and viewed in the direction of arrows indicated therein.

As shown in FIG. 3A, the housing 43 serving as the constituent member of the axial ball joint 15 according to the embodiment of the present invention includes the substantially disc-shaped bottom wall 43a and the cylindrical peripheral side wall 43b which are continuously provided, and is formed into the bottomed cylindrical shape.

As shown in FIG. 3D, a thickness t2 of the opening rim portion 43c of the peripheral side wall 43b is formed smaller than the thickness t1 of the peripheral side wall 43b (t1>t2) by the intermediary of a looped step portion 43e.

A central portion on the inside of the bottom wall 43a of the housing 43 is provided with a housing recess 43f as shown in FIG. 3A, for example, to house a substantially columnar projection 45e (see FIGS. 4A and 4B) provided to the ball seat 45. The housing recess 43f takes on a tapered shape of which diameter is gradually reduced toward the bottom. Functions of the housing recess 43f will be described later in detail.

A standing angle θ1 (see FIG. 3D) defined by the bottom wall 43a and the peripheral side wall 43b of the housing 43 is set to an appropriate angle within an angular range from 60° to 90°. In the example shown in FIG. 3D, the standing angle θ1 is set to 90°, which is a desirable angle for increasing the deformation strength (deformation resistance) concerning the boundary portion 52.

Here, in the case where the standing angle θ1 is set to an angle below 90° such as 85°, the peripheral side wall 43b takes on a tapered shape relative to the bottom wall 43a of the housing 43, of which diameter is gradually increased toward the opening rim portion 43c. In this case, when the housing 43 is positioned by using a jig (not shown) having a shape in conformity to this tapered shape, it is possible to perform centering of the housing 43 relative to the jig easily by exertion of a so-called self-centering effect.

Moreover, in the case where the standing angle θ1 is set to the angle below 90° such as 85°, an effect of reducing a required amount of the metal material (and weight saving at the same time) for forming the housing 43 can also be expected.

As shown in FIG. 3A, the looped inner bottom corner portion 43d located at the boundary portion 52 between the bottom wall 43a and the peripheral side wall 43b of the housing 43 is provided with the rib portions 51 for increasing the deformation strength concerning the boundary portion 52. The rib portions 51 are provided away from one another at predetermined intervals in the direction of the loop of the inner bottom corner portion 43d. In the example of FIG. 3A, eight rib portions 51 are provided at the inner bottom corner portion 43d located at the boundary portion 52 of the housing 43.

As shown in FIG. 3A, each of the rib portions 51 is formed at the inner bottom corner portion 43d, which is located at the boundary portion 52 between the bottom wall 43a and the peripheral side wall 43b of the housing 43, in such a way as to project in a brace shape from the outside to the inside of the housing 43. To be more precise, each of the rib portions 51 is formed into a triangular pyramid shape that includes a pair of substantially triangular inclined portions 51b with a ridge line 51a in between.

As shown in FIG. 3A, the ridge lines 51a of the rib portions 51 are inclined and extend straight across the boundary portion 52 between the bottom wall 43a and the peripheral side wall 43b in the brace shape. Here, an inclination angle θ2 (see FIG. 3E) of the ridge line 51a of each rib portion 51 is set to an appropriate angle within an angular range from 15° to 75°. In the example shown in FIG. 3E, the inclination angle θ2 of the ridge line 51a is set to 45°, which is the most desirable angle for increasing the deformation strength concerning the boundary portion 52.

In a transverse plane (see FIG. 3F) crossing the ridge line 51a of the rib portion 51, a ridge angle θ3 defined by the pair of inclined portions 51b, 51b with the ridge line 51a in between is set to an appropriate angle within an angular range from 60° to 90°. In the example shown in FIG. 3F, the ridge angle θ3 is set to 60°, which is a desirable angle for increasing the deformation strength concerning the boundary portion 52.

Of the rib portions 51, an inter-rib distance dr (see FIGS. 3A and 3C) representing an interval between peaks 51d of the neighboring rib portions 51 directed to the center of the housing 43 is defined by the following Formula (1):

$$dr \geq 2 \cdot t1 \times \sin(\theta 3/2) \quad \text{Formula (1)},$$

in which t1 is the thickness common to the bottom wall 43a and the peripheral side wall 43b of the housing 43, and θ3 is the above-mentioned ridge angle.

Here, in the inter-rib distance dr, a lower limit value $(2 \cdot t1 \times \sin(\theta 3/2))$ is set by the aforementioned Formula 1 in order to obviate a situation in which the neighboring rib portions 51 interfere with each other.

In the axial ball joint 15, the housing 43 is formed into the bottomed cylindrical shape by the sheet-metal press work inclusive of drawing and rib processing as described above. As a consequence, recesses 53 that are recessed from the outside to the inside of the housing 43 in accordance with the shapes of the rib portions 51 are formed at portions in the bottom wall 43a of the housing 43 on the back side of the rib portions 51 as shown in FIG. 3B.

As shown in FIG. 3B, the recesses 53 corresponding to the rib portions 51, respectively, are provided away from one another at predetermined intervals in the direction of a loop of an outer rim portion 43a1 of the bottom wall 43a. In the example of FIG. 3B, eight recesses 53 are provided at the outer rim portion 43a1 of the bottom wall 43a of the housing 43.

As shown in FIG. 3B, each of the recesses 53 includes a pair of substantially triangular inclined portions 53b, 53b with a trough line 53a in between. The respective rib portions 51 and recesses 53 play a role to increase the deformation strength concerning the boundary portion 52 of the housing 43 in cooperation with one another.

(Ball Seat 45 Serving as Constituent Member of Ball Joint 15 According to Embodiment of Present Invention)

Next, the ball seat 45 serving as a constituent member of the axial ball joint 15 will be described with reference to FIGS. 4A to 4E.

Figure 4A:
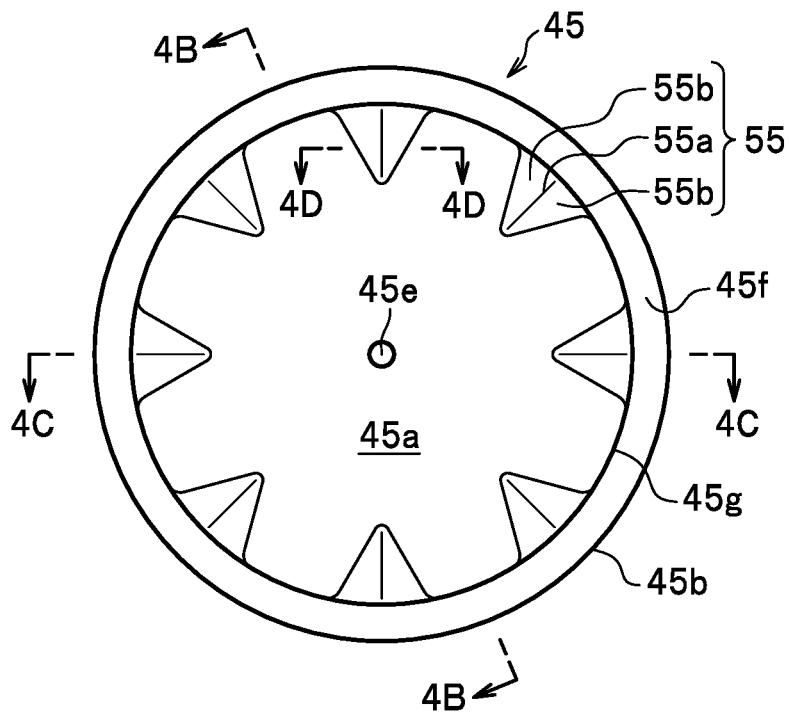
FIG. 4A is a diagram showing a ball seat serving as a constituent member of the ball joint according to the embodiment of the present invention, which is viewed from a bottom side thereof.
Figure 4B:
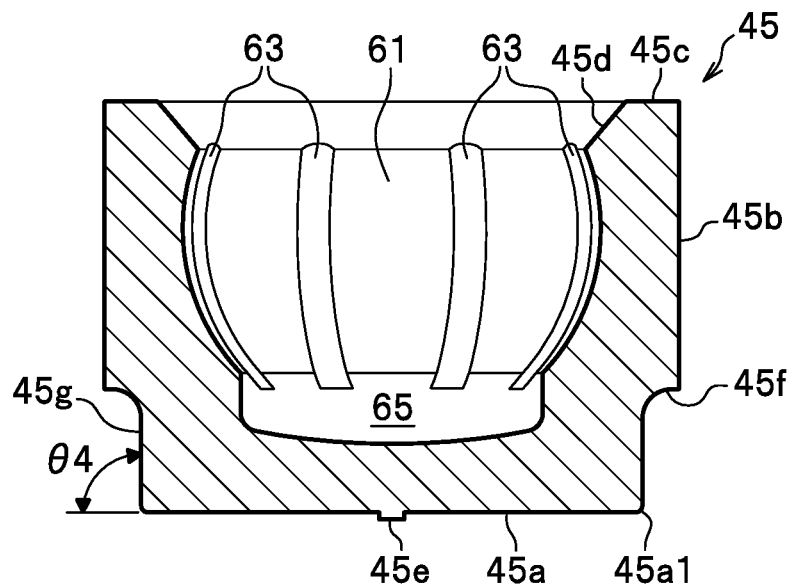
FIG. 4B is a cross-sectional view of the ball seat illustrated in FIG. 4A, which is taken along the 4B-4B line and viewed in the direction of arrows indicated therein.
Figure 4C:
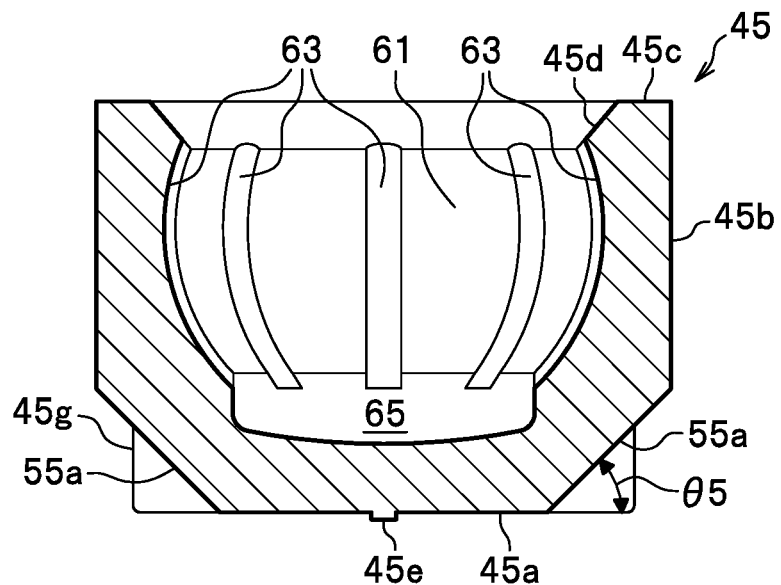
FIG. 4C is a cross-sectional view of the ball seat illustrated in FIG. 4A, which is taken along the 4C-4C line and viewed in the direction of arrows indicated therein.
Figure 4D:
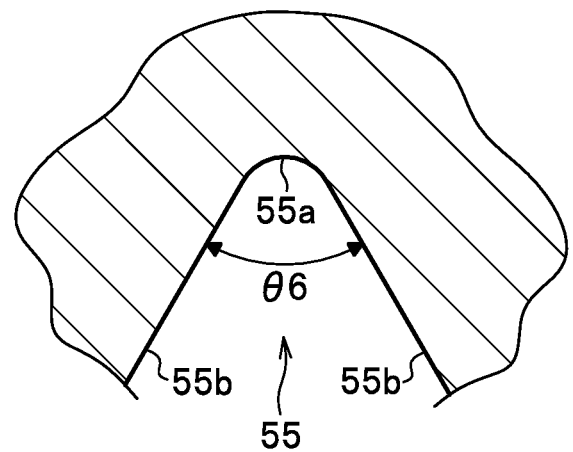
FIG. 4D is a cross-sectional view of a housing recess provided to the ball seat illustrated in FIG. 4A, which is taken along the 4D-4D line and viewed in the direction of arrows indicated therein.
Figure 4E:
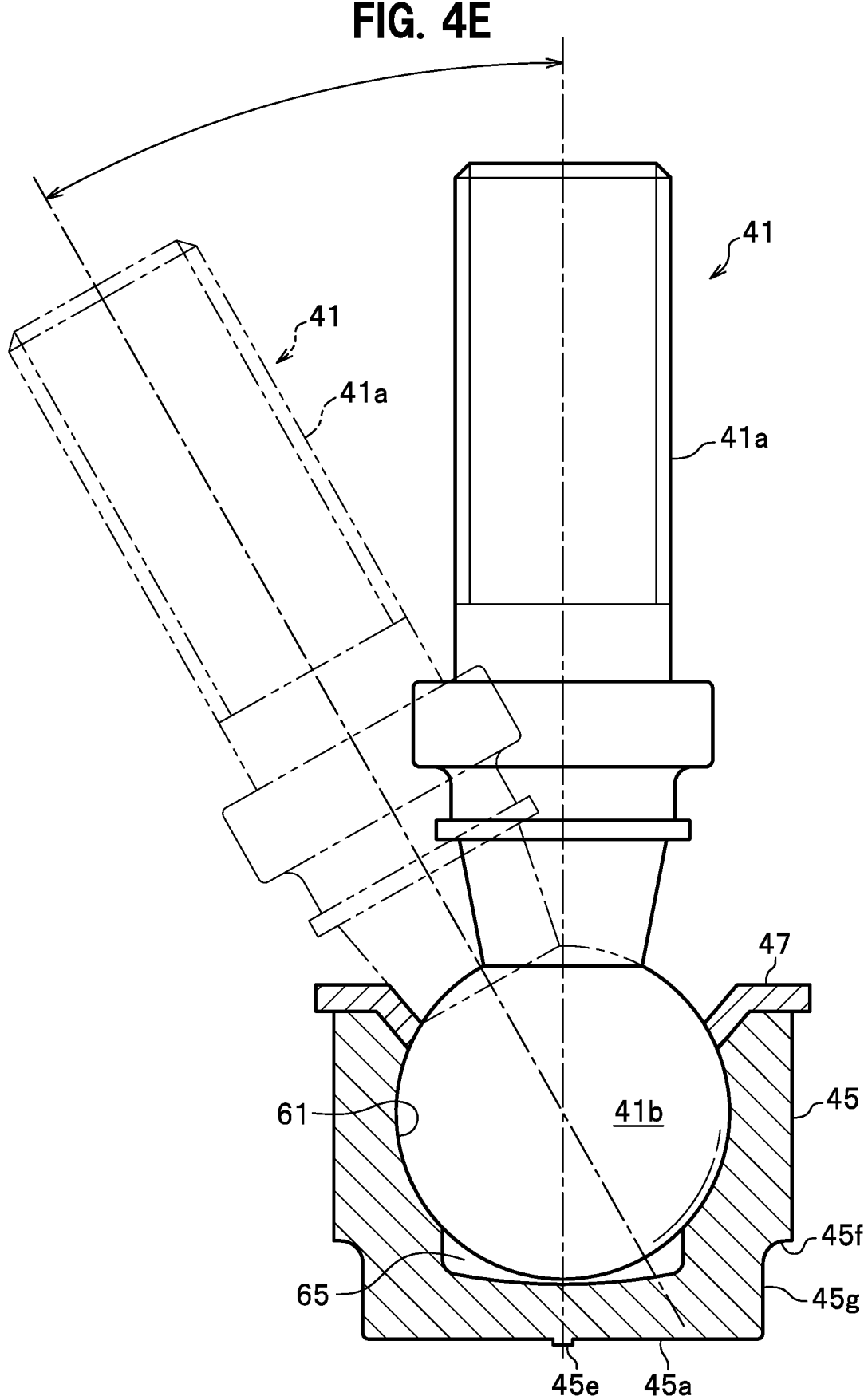
FIG. 4E is a diagram showing a state where a ball portion of a ball stud is attached to the ball seat.

FIG. 4A is a diagram showing the ball seat 45 serving as the constituent member of the ball joint 15 according to the embodiment of the present invention, which is viewed from a bottom side thereof. FIG. 4B is a cross-sectional view of the ball seat 45 illustrated in FIG. 4A, which is taken along the 4B-4B line and viewed in the direction of arrows indicated therein. FIG. 4C is a cross-sectional view of the ball seat 45 illustrated in FIG. 4A, which is taken along the 4C-4C line and viewed in the direction of arrows indicated therein. FIG. 4D is a cross-sectional view of a housing recess 55 provided to the ball seat 45 illustrated in FIG. 4A, which is taken along the 4D-4D line and viewed in the direction of arrows indicated therein. FIG. 4E is a diagram showing a state where the ball portion 41b of the ball stud 41 is attached to the ball seat 45.

As shown in FIGS. 4A to 4C, the resin ball seat 45 serving as the constituent member of the axial ball joint 15 includes a substantially disc-shaped bottom wall 45a and a cylindrical peripheral side wall 45b which are continuously provided, and is formed into a bottomed cylindrical shape. A looped opening rim portion 45c is formed at an upper part of the peripheral side wall 45b. A looped inclined surface 45d of which diameter is gradually increased toward the opening is formed on an inner peripheral side of the opening rim portion 45c. The ball seat 45 is manufactured by injection molding by using the thermoplastic resin as its raw material.

An outside diameter dimension concerning the peripheral side wall 45b of the ball seat 45 is set to a slightly smaller diameter dimension than an inside diameter dimension concerning the peripheral side wall 43b of the housing 43.

As shown in FIGS. 4A to 4C, a small diameter peripheral side wall 45g that takes on a smaller diameter dimension than the diameter dimension of the peripheral side wall 45b is provided at a lower part of the peripheral side wall 45b of the ball seat 45 by the intermediary of a looped step portion 45f. The small diameter peripheral side wall 45g plays a role to obviate a situation in which an outer rim portion 45a1 (see FIG. 4B) of the bottom wall 45a of the ball seat 45 butts and interferes with the inner bottom corner portion 43d of the housing 43 when the ball seat 45 is housed into the internal space of the housing 43.

A central portion of the bottom wall 45a of the ball seat 45 is provided with the substantially columnar projection 45e as shown in FIGS. 4A to 4C. The projection 45e of the ball seat 45 is designed to be housed in the housing recess 43f of the housing 43 in the state where the ball seat 45 is properly attached to the internal space of the housing 43. In short, the housing recess 43f of the housing 43 and the projection 45e of the ball seat 45 play a role to assist in attachment of the ball seat 45 in a properly positioned state into the internal space of the housing 43 in cooperation with each other.

A standing angle θ4 (see FIG. 4B) defined by the bottom wall 45a and the small diameter peripheral side wall 45g of the ball seat 45 is set to an appropriate angle within an angular range from 45° to 90°. In the example shown in FIG. 4B, the standing angle θ4 is set to 90°.

As shown in FIGS. 4B and 4C, the ball seat 45 is provided with a substantially spherical support portion 61 for slidably supporting the ball portion 41b of the ball stud 41. Grease grooves 63 are carved in the substantially spherical support portion 61 along the direction of the axis 105 (see FIG. 2) of the ball stud 41 in the neutral state. A grease (not shown) for smoothly sliding the ball portion 41b of the ball stud 41 is pooled in the grease grooves 63. A grease reservoir 65 for collecting the grease that drips down through the grease grooves 63 is provided below the support portion 61.

As shown in FIG. 4A, in the bottom wall 45a of the ball seat 45, housing recesses 55 are provided away from one another at predetermined intervals in the direction of a loop of an outer rim of the bottom wall 45a. In the example of FIG. 4A, eight housing recesses 55 are provided at the outer rim portion 45a1 (see FIG. 4B) of the bottom wall 45a of the ball seat 45. As shown in FIG. 4A, each of the housing recesses 55 includes a pair of substantially triangular inclined portions 55b, 55b with a trough line 55a in between. The housing recesses 55 are set to such a layout, a shape, and dimensions that can just house the respective rib portions 51 provided to the housing 43.

In the state where the ball seat 45 is properly attached to a regular position in the internal space of the housing 43, the rib portions 51 provided to the housing 43 are just fitted into the housing recesses 55 provided to the ball seat 45. This makes it possible to obviate a displacement in a loop direction of the ball seat 45 relative to the housing 43 (to stop rotation of the ball seat 45).

Meanwhile, the respective rib portions 51 and recesses 53 play a role to facilitate the centering and positioning of the ball seat 45 relative to the housing 43 in cooperation with one another.

As shown in FIG. 4C, the trough lines 55a of the housing recesses 55 are inclined and extend straight across the bottom wall 45a and the peripheral side wall 45b. Here, an inclination angle θ5 (see FIG. 4C) of the trough line 55a of each housing recess 55 is set to an appropriate angle within the angular range from 15° to 75°. In the example shown in FIG. 4C, the inclination angle θ5 of the trough line 55a is set to 45°, which is the same angle as the inclination angle θ2 of the ridge line 51a.

In a transverse plane (see FIG. 4D) crossing the trough line 55a of the housing recess 55, an angle θ6 defined by the pair of inclined portions 55b, 55b with the trough line 55a in between is set to an appropriate angle within the angular range from 30° to 70°. In the example shown in FIG. 4C, the angle θ6 is set to 60°, which is the same angle as the ridge angle θ3.

In the state where the ball seat 45 is properly attached to the regular position in the internal space of the housing 43, the inner side of the peripheral side wall 43b and the outer side of the peripheral side wall 45b, the inner side of the bottom wall 43a and the outer side of the bottom wall 45a, and the rib portions 51 and the housing recesses 55 come into contact with one another between the housing 43 and the ball seat 45.

Concerning contact strengths of these components, a construction may be adopted in which the contact strength between the bottom wall 43a and the bottom wall 45a is set lightly larger than the contact strength between the rib portions 51 and the housing recesses 55. The setting of the contact strengths of the components may be achieved by adjusting height dimensions of the ridge lines 51a of the rib portions 51.

This construction combines friction force attributed to the contact between the bottom wall 43a and the bottom wall 45a with engagement force attributed to the contact between the rib portions 51 and the housing recesses 55, thereby favorably promoting integration between the housing 43 and the ball seat 45.

In the axial ball joint 15 constructed as described above, the ball stud 41 is located at the neutral position while using the ball portion 41b supported by the housing 43 as a pivot in the state with no load application as illustrated with solid lines in FIG. 4E. On the other hand, in a state of receiving the applied load as illustrated with chain double-dotted lines in FIG. 4E, the ball stud 41 swings as shown in FIG. 4E while using the ball portion 41b supported by the housing 43 as the pivot.

Now, let us assume that the applied load is inputted to the bottom wall 43a of the housing 43 in the axial ball joint 15 through the support bar 14. The applied load inputted to the bottom wall 43a of the housing 43 is transmitted to the peripheral side wall 43b of the housing 43.

Here, the boundary portion 52 between the bottom wall 43a and the peripheral side wall 43b of the housing 43 is provided with the rib portions 51 by the sheet-metal press work inclusive of drawing and rib processing conducted in the manufacturing process of the housing 43. For this reason, the deformation strength at the boundary portion 52 is significantly increased as compared to the case without performing rib processing.

As a consequence, even in the case where the applied load is inputted to the bottom wall 43a of the housing 43 through the support bar 14 and if the applied load is large, the axial ball joint 15 can properly transmit the applied load to the peripheral side wall 23b of the housing 43 without causing the deformation involving the boundary portion 52.

Therefore, according to the axial ball joint 15, the housing 43 is formed into the bottomed cylindrical shape by the sheet-metal press work inclusive of drawing and rib processing, and the rib portions 51 are provided at the boundary portion 52 between the bottom wall 43a and the peripheral side wall 43b of the housing 43. Thus, it is possible to expand the degree of freedom of selection in the manufacturing process of the housing 43, to contribute to weight saving, and to achieve simplification of the manufacturing process.

(Housing 63 of Ball Joint 15 According to Modified Example of Embodiment of Present Invention)

Next, a metal housing 63 serving as a constituent member of a ball joint 15 according to a modified example of the embodiment of the present invention will be described with reference to FIGS. 5A and 5B.

Figure 5A:
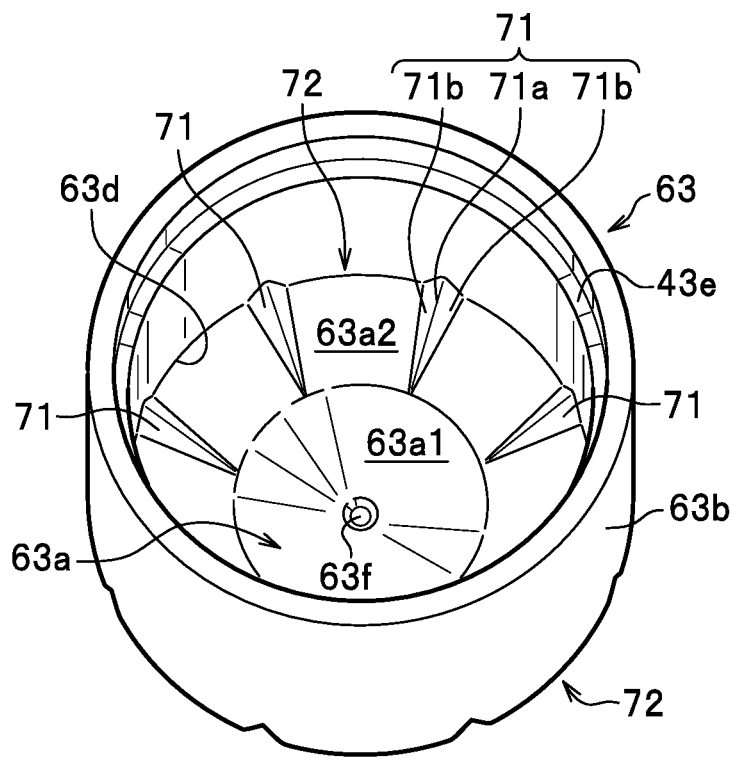
FIG. 5A is a perspective view showing exterior appearance of a housing serving as a constituent member of a ball joint according to a modified example of the embodiment of the present invention, which is viewed obliquely from a bottom side thereof.

FIG. 5A is a perspective view showing an internal space of the housing 63 serving as the constituent member of the ball joint 15 according to the embodiment of the present invention, which is viewed through an opening thereof. FIG. 5B is a perspective view showing exterior appearance of the housing 63 illustrated in FIG. 5A, which is viewed obliquely from a bottom side thereof.

There are constituent members having the functions common to the ball joint 15 according to the embodiment of the present invention and the ball joint 15 according to the modified example of the embodiment of the present invention. In this regard, a description of the ball joint 15 according to the modified example of the embodiment of the present invention will be made by explaining constituent members having functions different from each other in detail while simplifying the explanations of the constituent members having the functions common to each other.

As shown in FIG. 5A, the housing 63 serving as the constituent member of the axial ball joint 15 according to the modified example of the embodiment of the present invention includes a substantially disc-shaped bottom wall 63a and a cylindrical peripheral side wall 63b which are continuously provided, and is formed into a bottomed cylindrical shape.

A central portion on the inside of the bottom wall 63a of the housing 63 is provided with a housing recess 63f as shown in FIG. 5A to house a substantially columnar projection (not shown) provided to a ball seat (not shown) according to the modified example.

As shown in FIG. 5A, a looped inner bottom corner portion 63d located at a boundary portion 72 between the bottom wall 63a and the peripheral side wall 63b of the housing 63 is provided with rib portions 71 for increasing a deformation strength concerning the boundary portion 72. The rib portions 71 are provided away from one another at predetermined intervals in the direction of the loop of the inner bottom corner portion 63d. In the example of FIG. 5A, eight rib portions 71 are provided at the inner bottom corner portion 63d located at the boundary portion 72 of the housing 63.

As shown in FIG. 5A, each of the rib portions 71 is formed at the inner bottom corner portion 63d, which is located at the boundary portion 72 between the bottom wall 63a and the peripheral side wall 63b of the housing 63, in such a way as to project in a brace shape from the outside to the inside of the housing 63. To be more precise, each of the rib portions 71 is formed into a triangular pyramid shape that includes a pair of substantially triangular inclined portions 71b with a ridge line 71a in between.

As shown in FIG. 5A, the ridge lines 71a of the rib portions 71 are inclined and extend straight across the boundary portion 72 between the bottom wall 63a and the peripheral side wall 63b in the brace shape.

In the axial ball joint 15 according to the modified example, the housing 63 is formed into the bottomed cylindrical shape by the sheet-metal press work inclusive of drawing and rib processing as described above. As a consequence, recesses 73 that are recessed from the outside to the inside of the housing 63 in accordance with the shapes of the rib portions 71 are formed at portions in the bottom wall 63a of the housing 63 on the back side of the rib portions 71 as shown in FIG. 5B.

Figure 5B:
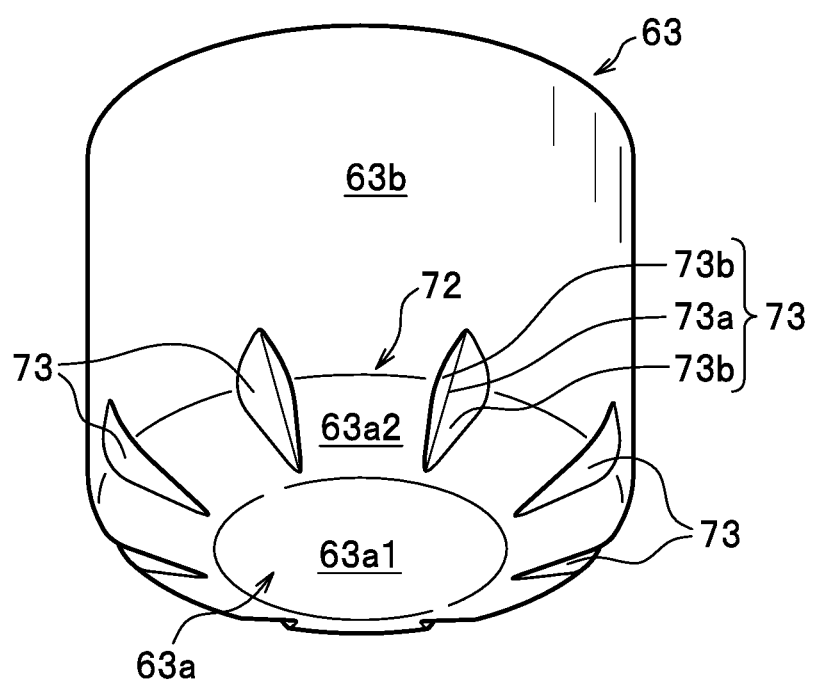
FIG. 5B is a perspective view showing an internal space of the housing according to the modified example of the embodiment of the present invention, which is viewed through an opening thereof.

As shown in FIG. 5B, the recesses 73 corresponding to the rib portions 71, respectively, are provided away from one another at predetermined intervals in the direction of a loop of an outer rim portion 63a2 of the bottom wall 63a. In the example of FIG. 5B, eight recesses 73 are provided at the outer rim portion 63a2 of the bottom wall 63a of the housing 63.

As shown in FIG. 5B, each of the recesses 73 includes a pair of substantially triangular inclined portions 73b, 73b with a trough line 73a in between. The respective rib portions 71 and recesses 73 play a role to increase the deformation strength concerning the boundary portion 72 of the housing 63 in cooperation with one another.

Here, a description will be given of the constituent members having functions different from each other between the ball joint 15 according to the embodiment of the present invention and the ball joint 15 according to the modified example of the embodiment of the present invention.

Specifically, in the housing 43 according to the embodiment of the present invention, the outer part of the bottom wall 43a is substantially flat (see FIG. 3B).

In contrast, in the housing 63 according to the modified example, the outer part of the bottom wall 63a is provided with a circular flat portion 63a1 situated in the vicinity of its center, and the outer rim portion 63a2 in a tapered shape. The radius of the circular flat portion 63a1 is set to a larger dimension than the radius of the support bar 14.

The outer rim portion 63a2 in the tapered shape is set in order to easily perform centering of the housing 63 according to the modified example relative to a jig. When the housing 63 is positioned by using the jig having a shape in conformity to this tapered shape, it is possible to perform the centering of the housing 63 relative to the jig easily by exertion of the so-called self-centering effect.

Now, let us assume that the applied load is inputted to the bottom wall 63a of the housing 63 in the axial ball joint 15 according to the modified example through the support bar 14. The applied load inputted to the bottom wall 63a of the housing 63 is transmitted to the peripheral side wall 63b of the housing 63. Here, the boundary portion 72 between the bottom wall 63a and the peripheral side wall 63b of the housing 63 is provided with the rib portions 71 by the sheet-metal press work inclusive of drawing and rib processing conducted in the manufacturing process of the housing 63. For this reason, the deformation strength at the boundary portion 72 is significantly increased as compared to the case without performing rib processing.

As a consequence, even in the case where the applied load is inputted to the bottom wall 63a of the housing 63 through the support bar 14 and if the applied load is large, the axial ball joint 15 according to the modified example can properly transmit the applied load to the peripheral side wall 63b of the housing 63 without causing the deformation involving the boundary portion 72.

Therefore, according to the axial ball joint 15 of the modified example, the housing 63 is formed into the bottomed cylindrical shape by the sheet-metal press work inclusive of drawing and rib processing, and the rib portions 71 are provided at the boundary portion 72 between the bottom wall 63a and the peripheral side wall 63b of the housing 63. Thus, it is possible to expand the degree of freedom of selection in the manufacturing process of the housing 63, to contribute to weight saving, and to achieve simplification of the manufacturing process.

(Ball Joint Manufacturing Method According to Embodiment of Present Invention)

Next, a ball joint manufacturing method according to the embodiment of the present invention will be described with reference to FIG. 6 while using the axial ball joint 15 as an example of the ball joint.

FIG. 6 is an operation flowchart showing the ball joint manufacturing method according to the embodiment of the present invention.

The ball joint manufacturing method according to the embodiment of the present invention is premised on the method of manufacturing the axial ball joint 15 which includes the ball stud 41 provided with the stud portion 41a and the ball portion 41b, the metallic housing 43 configured to rotatably support the ball portion 41b of the ball stud 41, and the resin ball seat 45 provided in the interposed manner between the ball portion 41b and the housing 43.

As shown in FIG. 6, the method of manufacturing the axial ball joint 15 includes the following manufacturing steps in chronological order, namely, a step of forming the housing 43 by press work (step S1), a step of attaching the support bar 14 to the bottom wall 43a of the housing 43 (step S2), a step of fitting the ball stud 41 with the ball seat 45 attached thereto into the internal space of the housing 43 (step S3), and a step of integrating the ball stud 41 with the ball seat 45 attached thereto with the housing 43 by subjecting the opening rim portion 43c of the housing 43 to swaging by bending the opening rim portion 43c inward in such a way as to confine the stop ring 47 (see FIG. 2) (step S4).

In addition, the step of forming the housing 43 by press work corresponding to step S1 includes a step (step S1a) of subjecting the housing 43 to drawing and subjecting the boundary portion 52 between the bottom wall 43a and the peripheral side wall 43b of the housing 43 to rib processing into a brace shape.

According to the method of manufacturing the axial ball joint 15, the step of forming the housing 43 by press work includes the step of subjecting the housing 43 to drawing and subjecting the boundary portion 52 between the bottom wall 43a and the peripheral side wall 43b of the housing 43 to rib processing into a brace shape. Thus, it is possible to expand the degree of freedom of selection in the manufacturing process of the housing 43, to contribute to weight saving, and to achieve simplification of the manufacturing process.

(Operations and Effects Achieved by Ball Joint According to Embodiment of Present Invention)

Next, operations and effects achieved by the ball joint according to the embodiment of the present invention will be described by using the axial ball joint 15 as the example of the ball joint.

A ball joint according to a first aspect of the present invention is premised on the axial ball joint 15 which includes the ball stud 41 provided with the stud portion 41a and the ball portion 41b, the metal housing 43 configured to rotatably support the ball portion 41b of the ball stud 41, and the resin ball seat 45 provided in the interposed manner between the ball portion 41b and the housing 43.

The housing 43 is formed into the bottomed cylindrical shape by press work. The bottom wall 43a and the peripheral side wall 43b of the housing 43 are set to thicknesses substantially equal to each other. The rib portions 51 are formed at the boundary portion 52 between the bottom wall 43a and the peripheral side wall 43b of the housing 43 in such a way as to project in the brace shape from the outside to the inside of the housing 43.

According to the ball joint of the first aspect of the present invention, the rib portions 51 are provided at the boundary portion 52 between the bottom wall 43a and the peripheral side wall 43b of the housing 43 in the process of forming the housing 43 into the bottomed cylindrical shape by press work. Thus, it is possible to expand the degree of freedom of selection in the manufacturing process of the housing 43, to contribute to weight saving, and to achieve simplification of the manufacturing process.

Meanwhile, a ball joint according to a second aspect of the present invention is the ball joint according to the first aspect of the present invention, in which the housing recesses 55 configured to house the rib portions 51 are provided at regions of the ball seat 45 corresponding to the rib portions 51.

According to the ball joint of the second aspect of the present invention, the housing recesses 55 to house the rib portions 51 are provided at the regions of the ball seat 45 corresponding to the rib portions 51. Thus, it is possible to obviate displacement in the direction of the loop of the ball seat 45 relative to the housing 43 by causing the rib portions 51 to engage with the housing recesses 55.

In the meantime, a ball joint according to a third aspect of the present invention is the ball joint according to the first aspect of the present invention, in which the support bar 14 is joined to the bottom wall 43a of the housing 43.

According to the ball joint of the third aspect of the present invention, the support bar 14 is joined to the bottom wall 43a of the housing 43. Thus, it is possible to reliably perform transmission of the applied load in both directions between the support bar 14 and the housing 43.

Meanwhile, a ball joint according to a fourth aspect of the present invention is the ball joint according to the first aspect of the present invention, in which the rib portions 51 are formed at equal intervals in a circumferential direction of the boundary portion, and the number of the rib portions 51 is at least three.

According to the ball joint of the fourth aspect of the present invention, the rib portions 51 are formed at equal intervals in the circumferential direction of the boundary portion 52, and the number of the rib portions 51 is at least three, so that an effect to increase the deformation strength concerning the boundary portion 52 between the bottom wall 43a and the peripheral side wall 43b of the housing 43 can be expected.

In the meantime, a ball joint according to a fifth aspect of the present invention is the ball joint according to the first aspect of the present invention, in which the recesses 53 being recessed from the outside to the inside of the housing 43 in accordance with the shapes of the rib portions 51 are formed at the portions in the bottom wall 43a of the housing 43 on the back side of the rib portions 51.

According to the ball joint of the fifth aspect of the present invention, the recesses 53 in accordance with the shapes of the rib portions 51 are formed at the portions in the bottom wall 43a of the housing 43 on the back side of the rib portions 51, and the respective rib portions 51 and recesses 53 cooperate with one another. Thus, it is possible to expect an effect to increase the deformation strength concerning the boundary portion 52 of the housing 43.

Meanwhile, a ball joint according to a sixth aspect of the present invention is the ball joint according to the first aspect of the present invention, in which each rib portion 51 is formed into the triangular pyramid shape including the pair of substantially triangular inclined portions 51b, 51b with the ridge line 51a in between.

According to the ball joint of the sixth aspect of the present invention, each rib portion 51 is formed into the triangular pyramid shape including the pair of substantially triangular inclined portions 51b, 51b with the ridge line 51a in between. Thus, it is possible to expect the effect to increase the deformation strength concerning the boundary portion 52 of the housing 43 by the workings of the triangular pyramid-shaped rib portions 51.

In the meantime, a ball joint according to a seventh aspect of the present invention is the ball joint according to the sixth aspect of the present invention, in which an angle in the angular range from 60° to 90° is selectively set to the ridge angle θ3 defined by the pair of inclined portions 51b, 51b with the ridge line 51a in between in the transverse plane crossing the ridge line 51a of each rib portion 51.

According to the ball joint of the seventh aspect of the present invention, the angle in the angular range from 60° to 90° is selectively set to the ridge angle θ3. Thus, it is possible to expect the effect to increase the deformation strength concerning the boundary portion 52 of the housing 43 by the workings of the triangular pyramid-shaped rib portions 51.

Meanwhile, a ball joint according to an eighth aspect of the present invention is the ball joint according to the seventh aspect of the present invention, in which the inter-rib distance dr representing an interval between the neighboring rib portions 51 among the rib portions is set in accordance with the above-described Formula 1 defined as (dr≥2·t1×sin(θ3/2)), where t1 is the thickness of the bottom wall 43a and the peripheral side wall 43b of the housing 43 and θ3 is the ridge angle.

According to the ball joint of the eighth aspect of the present invention, the lower limit value (2·t1×sin(θ3/2)) of the inter-rib distance dr is set in accordance with the above-described Formula 1. Thus, it is possible to obviate the situation in which the neighboring rib portions 51 interfere with each other.

In the meantime, a ball joint according to a ninth aspect of the present invention is the ball joint according to the first aspect of the present invention, in which the outer rim portion in a tapered shape is formed on the outside of the bottom wall 63a of the housing 63.

According to the ball joint of the ninth aspect of the present invention, the outer rim portion 63a2 (see FIG. 5B) in the tapered shape is formed on the outside of the bottom wall 63a of the housing 63. Thus, it is possible to expect the effect to easily perform the centering of the housing 63 relative to the jig. This is due to the following reason. Specifically, when the housing 63 is positioned by using the jig having the shape in conformity to the tapered shape of the outer rim portion 63a2, the centering of the housing 63 relative to the jig is facilitated by exertion of the so-called self-centering effect.

Meanwhile, a stabilizer link according to a tenth aspect of the present invention is the stabilizer link 11 configured to establish connection between the suspension device 17 and the stabilizer 18 provided to the vehicle 10, which includes a pair of connecting portions 13 and 15, and the support bar 14 connecting between the pair of connecting portions 13 and 15, in which the ball joint according to any one of the first to ninth aspects of the present invention is provided to at least one of the pair of connecting portions 13 and 15 in the stabilizer link 11.

According to the stabilizer link 11 of the tenth aspect of the present invention, it is possible to expand the degree of freedom of selection in the manufacturing process of the housing 43, to contribute to weight saving, and to achieve simplification of the manufacturing process.

In the meantime, the ball joint manufacturing method according to an eleventh aspect of the present invention is premised on the method of manufacturing the axial ball joint which includes the ball stud 41 provided with the stud portion 41a and the ball portion 41b, the metal housing 43 configured to rotatably support the ball portion 41b of the ball stud 41, and the resin ball seat 45 provided in the interposed manner between the ball portion 41b and the housing 43.

The ball joint manufacturing method includes manufacturing steps in chronological order, the manufacturing steps including, the step of forming the housing 43 by press work (step S1), the step of attaching the support bar 14 to the bottom wall 43a of the housing 43 (step S2), the step of fitting the ball stud 41 with the ball seat 45 attached thereto into the internal space of the housing 43 (step S3), and the step of integrating the ball stud 41 with the ball seat 45 attached thereto with the housing 43 by subjecting the opening rim portion 43c of the housing 43 to swaging by bending the opening rim portion 43c inward in such a way as to confine the stop ring 47 (see FIG. 2) (step S4).

The step of forming the housing 43 by press work corresponding to step S1 includes the step (step S1a) of subjecting the housing 43 to drawing and subjecting the boundary portion 52 between the bottom wall 43a and the peripheral side wall 43b of the housing 43 to rib processing into a brace shape.

According to the ball joint manufacturing method of the eleventh aspect of the present invention, the step of forming the housing 43 by press work includes the step of subjecting the housing 43 to drawing and subjecting the boundary portion 52 between the bottom wall 43a and the peripheral side wall 43b of the housing 43 to rib processing into a brace shape. Thus, it is possible to expand the degree of freedom of selection in the manufacturing process of the housing 43, to contribute to weight saving, and to achieve simplification of the manufacturing process.

Other Embodiments

The embodiments described above demonstrate the examples of realization of the present invention. In this context, the technical scope of the present invention shall not be interpreted in a limited manner due to these embodiments, because the present invention can be carried out in various other aspects without departing from the gist or the principal features thereof.

For instance, in the description of the embodiment according to the present invention (see paragraph 0051), the example has been described in which the small diameter peripheral side wall 45g is provided at the lower part of the peripheral side wall 45b of the ball seat 45 by the intermediary of the looped step portion 45f. However, the present invention is not limited to this example.

Here, the small diameter peripheral side wall 45g is provided for the purpose of obviating the situation in which the outer rim portion 45a1 of the bottom wall 45a of the ball seat 45 butts and interferes with the inner bottom corner portion 43*d* of the housing 43 when the ball seat 45 is housed into the internal space of the housing 43.

In light of the above-mentioned purpose, any structure (including provision of a tapered portion to the lower part of the peripheral side wall 45*b* of the ball seat 45 in such a way as to reduce a diameter gradually toward the bottom wall 45*a* side of the ball seat 45) may be adopted which is capable of obviating the situation in which the outer rim portion 45*a*1 of the bottom wall 45*a* of the ball seat 45 butts and interferes with the inner bottom corner portion 43*d* of the housing 43.

REFERENCE SIGNS LIST

10 vehicle
11 stabilizer link
12 vehicle body
13 radial ball joint (ball joint)
14 support bar
15 axial ball joint (ball joint)
17 suspension device
18 stabilizer
41 ball stud
41*a* stud portion
41*b* ball portion
43 housing
43*a* bottom wall of housing
43*b* peripheral side wall of housing
45 ball seat
51 rib portions
51*a* ridge line of rib portion
51*b* pair of inclined portions of rib portion
52 boundary portion between bottom wall and peripheral side wall of housing
53 recess on back side of rib portion
55 housing recess of ball seat
63 housing according to modified example
63*a* bottom wall of housing according to modified example
63*a*2 outer rim portion of housing according to modified example
63*b* peripheral side wall of housing according to modified example
65 ball seat according to modified example
71 rib portions according to modified example
71*a* ridge line of rib portion according to modified example
71*b* pair of inclined portions of rib portion according to modified example
72 boundary portion between bottom wall and peripheral side wall of housing according to modified example

The invention claimed is:

1. A ball joint comprising:
a ball stud including a stud portion and a ball portion;
a metal housing configured to rotatably support the ball portion of the ball stud; and
a resin ball seat provided in an interposed manner between the ball portion and the housing,
wherein
the housing is formed in a bottomed cylindrical shape by press work,
the housing has a bottom wall and a peripheral side wall which are set respectively to thicknesses substantially equal to each other, and
the bottom wall and the peripheral side wall of the housing have therebetween a boundary portion formed with multiple rib portions which project in a brace shape from outside to inside of the housing.

2. The ball joint according to claim 1, wherein the ball seat has housing recesses configured to house the rib portions, and wherein the housing recesses are provided at regions of the ball seat corresponding to the rib portions.

3. The ball joint according to claim 1, wherein the housing has a bottom wall to which a support bar is joined.

4. The ball joint according to claim 1, wherein the rib portions comprise at least three rib portions which are formed at equal intervals in a circumferential direction of the boundary portion.

5. The ball joint according to claim 1, wherein the bottom wall of the housing on a back side of the rib portions is formed with recesses which are recessed from outside to inside of the housing in accordance with shapes of the rib portions.

6. The ball joint according to claim 1, wherein the boundary portion of the housing includes an outer rim portion formed in a tapered shape.

7. A stabilizer link configured to establish connection between a suspension device and a stabilizer mounted on a vehicle, comprising:
a pair of connecting portions; and
a support bar connecting the pair of connecting portions,
wherein at least one of the pair of connecting portions in the stabilizer link is provided with the ball joint according to claim 1.

8. A ball joint comprising:
a ball stud including a stud portion and a ball portion;
a metal housing configured to rotatably support the ball portion of the ball stud; and
a resin ball seat provided in an interposed manner between the ball portion and the housing,
wherein
the housing is formed in a bottomed cylindrical shape by press work,
the housing has a bottom wall and a peripheral side wall which are set respectively to thicknesses substantially equal to each other,
the bottom wall and the peripheral side wall of the housing have therebetween a boundary portion formed with multiple rib portions which project in a brace shape from outside to inside of the housing, and
wherein each rib portion is formed in a triangular pyramid shape and includes a pair of substantially triangular inclined portions with a ridge line in between.

9. The ball joint according to claim 8,
wherein the pair of inclined portions with the ridge line in between define a ridge angle in a transverse plane crossing the ridge line of each rib portion, and
wherein the ridge angle is selectively set to an angle in an angular range from 60° to 90°.

10. The ball joint according to claim 9, wherein the multiple rib portions comprise neighboring rib portions having therebetween an interval of an inter-rib distance dr which is set to $$dr \geq 2 \cdot t1 \times \sin(\theta 3/2),$$

where t1 is a thickness common to the bottom wall and the peripheral side wall of the housing and θ3 is the ridge angle.

11. A method of manufacturing a ball joint including a ball stud provided with a stud portion and a ball portion, a metal housing configured to rotatably support the ball portion of the ball stud, and a resin ball seat provided in an interposed manner between the ball portion and the housing, the method comprising:

forming the housing by press work;
attaching a support bar to a bottom wall of the housing;
fitting the ball stud with the ball seat attached thereto into an internal space of the housing; and
integrating the ball stud with the ball seat attached thereto with the housing by subjecting an opening rim portion of the housing to swaging by bending the opening rim portion inward,
wherein the forming the housing by press work includes subjecting the housing to drawing and subjecting a boundary portion between the bottom wall and a peripheral side wall of the housing to rib processing into a brace shape.

* * * * *